(12) United States Patent
Emberling et al.

(10) Patent No.: US 11,362,520 B1
(45) Date of Patent: Jun. 14, 2022

(54) INTELLIGENT ROUTING OF ELECTRICITY

(71) Applicant: Global Integrated Renewable Solutions, LLC, Brentwood, TN (US)

(72) Inventors: Dennis Emberling, Brentwood, TN (US); David Shimon, Hallendale Beach, FL (US)

( * ) Notice: Subject to any disclaimer, the term of this patent is extended or adjusted under 35 U.S.C. 154(b) by 0 days.

(21) Appl. No.: 17/444,665

(22) Filed: Aug. 8, 2021

(51) Int. Cl.
*H02J 3/38* (2006.01)
*H02J 13/00* (2006.01)
*G06Q 50/06* (2012.01)
*G05B 15/02* (2006.01)

(52) U.S. Cl.
CPC .............. *H02J 3/381* (2013.01); *G05B 15/02* (2013.01); *G06Q 50/06* (2013.01); *H02J 13/00002* (2020.01); *H02J 2300/24* (2020.01)

(58) Field of Classification Search
None
See application file for complete search history.

(56) References Cited

U.S. PATENT DOCUMENTS

| | | | | |
|---|---|---|---|---|
| 2009/0189445 A1* | 7/2009 | Strizki | ...................... | H02J 7/34 307/21 |
| 2012/0029720 A1* | 2/2012 | Cherian | ............ | H02J 13/00002 700/297 |
| 2012/0144828 A1* | 6/2012 | Lazaris | ................... | H02J 3/381 60/641.1 |
| 2012/0150361 A1* | 6/2012 | Lazaris | ................... | H02J 3/004 700/297 |
| 2012/0150679 A1* | 6/2012 | Lazaris | ..................... | H02J 3/14 705/26.2 |
| 2013/0162215 A1* | 6/2013 | Cooper | .................. | G05B 15/02 320/127 |
| 2013/0218548 A1* | 8/2013 | Lazaris | .................. | G06Q 50/06 703/18 |
| 2016/0072289 A1* | 3/2016 | Lazaris | ............. | G06Q 30/0605 700/287 |
| 2016/0124411 A1* | 5/2016 | Tinnakornsrisuphap | ..................... | H02J 3/14 700/291 |

(Continued)

OTHER PUBLICATIONS

Dunn et al., "Electrical Energy Storage for the Grid: A Battery of Choices", Nov. 18, 2011, vol. 334, Science. (Year: 2011).*

(Continued)

*Primary Examiner* — Mohammad Ali
*Assistant Examiner* — Kelvin Booker

(57) ABSTRACT

In one embodiment, a generation facility for producing electricity includes one or more electricity generating elements for producing electricity from a renewable energy source. The generation facility also includes a controller conductively coupled to: (1) a first conductive path leading from the one or more electricity generating elements; (2) a second conductive path leading to a public utility network; and (3) a third conductive path leading to an energy storage system for storing electrical energy. The energy storage system is also conductively coupled to a fourth conductive path leading to the public utility network. The controller includes one or more processors coupled to a non-transitory computer readable storage media embodying software that is operable when executed by the processors to determine whether to send electricity generated by the one or more electricity generating elements to the energy storage system.

20 Claims, 4 Drawing Sheets

(56) References Cited

U.S. PATENT DOCUMENTS

| | | | |
|---|---|---|---|
| 2018/0023547 A1* | 1/2018 | Jeffus | F03D 9/007 |
| | | | 290/44 |
| 2018/0262005 A1* | 9/2018 | Lazaris | H02J 3/382 |
| 2019/0089155 A1* | 3/2019 | Cui | G06Q 10/00 |

OTHER PUBLICATIONS

Ancillotti et al., "The Role of the RPL Routing Protocol for Smart Grid Communications", IEEE Communications Magazine • Jan. 2013. (Year: 2013).*
Falvo et al., "Technologies for Smart Grids: a brief review", 2013 IEEE. (Year: 2013).*
Reddy et al., "A review of Integration, Control, Communication and Metering (ICCM) of renewable energy based smart grid", Jun. 2013, Renewable and Sustainable Energy Reviews 38 (2014) 180-192. (Year: 2013).*
Wang et al., "Demand Side Load Management of Smart Grids Using Intelligent Trading/Metering/ Billing System", 2010 IEEE, 2011 IEEE Trondheim PowerTech. (Year: 2010).*
Wu et al., "Smart Grids with Intelligent Periphery: An Architecture for the Energy Internet", Nov. 2015, Engineering vol. 1 • Issue 4 • Dec. 2015. (Year: 2015).*
Gill et al., "Dynamic Optimal Power Flow for Active Distribution Networks", Jan. 2014, IEEE Transactions on Power Systems, vol. 29, No. 1. (Year: 2014).*
Denholm, Paul, Wesley Cole, A. Will Frazier, Kara Podkaminer, and Nate Blair. 2021. "The Four Phases of Storage Deployment: A Framework for the Expanding Role of Storage in the U.S. Power System" Golden, CO: National Renewable Energy Laboratory accessed: https://www.nrel.gov/docs/fy21osti/77480.pdf.

* cited by examiner

INTELLIGENT ROUTING OF ELECTRICITY

TECHNICAL FIELD

This disclosure generally relates to systems and networks for generating and distributing electricity.

BACKGROUND

Electrical circuits use current to transfer electrical energy between a power generator and a load, which uses the electrical energy. Large-scale power grids, commonly in the form operated by a public utility, provide electrical energy to end users, such as business and residences. The source of the generator's power can be a fossil fuel, such as coal or natural gas; a nuclear source; hydropower; or a renewable source, such as solar, wind, or geothermal. Public utility grids use circuit technology, such as transformers, for transmitting and distributing electrical energy to end users at varying voltages. Typically, in the United States electrical energy is delivered to end users at 240 volts to power various electrical loads at the end user's site, through an interface such as the conventional two-or-three-pronged electrical outlet.

DESCRIPTION OF EXAMPLE EMBODIMENTS

Figure 1:
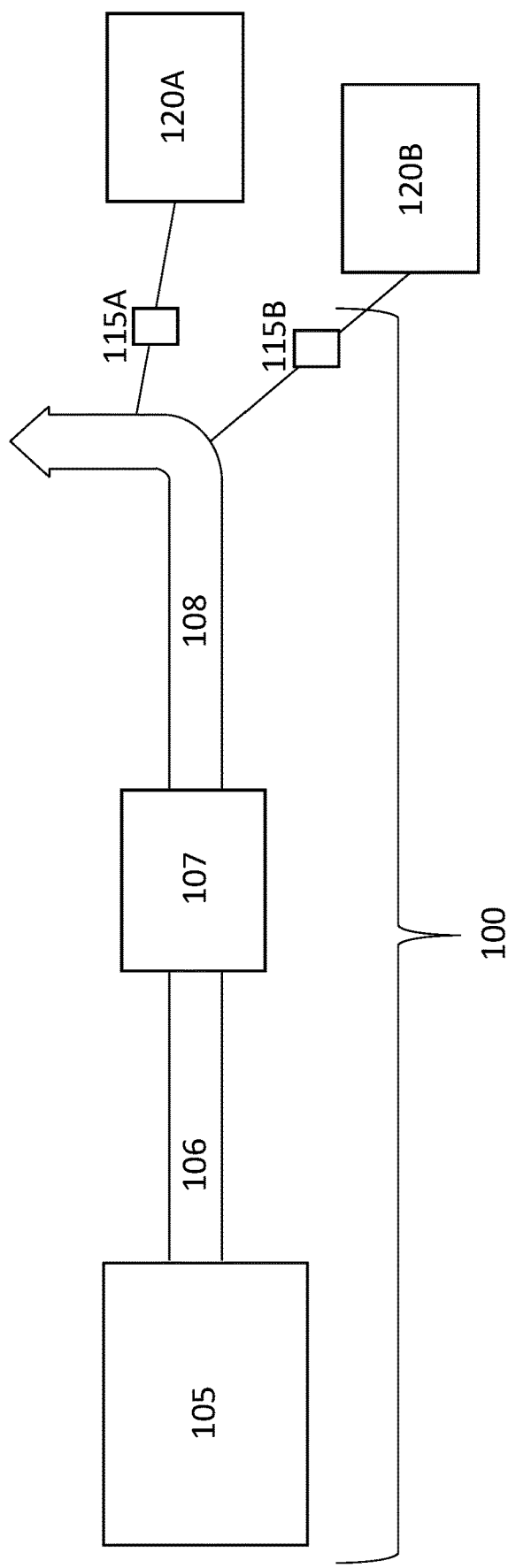
FIG. 1 illustrates an example network for providing electricity by a public utility.

FIG. 1 illustrates an example system 100 for providing electricity by a public utility. System 100 is referred to herein as a public-utility system or network, although not every component of system 100 is necessarily owned by a public utility. Generation facilities 105 generate electricity for usage by end users, such as end users 120A-B. End users can be private or public facilities, such as residences, business, libraries, courthouses, hospitals, educational (e.g., college) campuses, municipal facilities (such as a wastewater treatment plant), etc. Generation facilities 105 include facilities for generating electricity, such as the facilities associated with a hydrological dam or facilities associated with a coal-fired power plant. Generation facilities 105 can also include energy storage facilities, which may be separate from or a part of the facilities for generating electricity. For example, energy storage facilities can include batteries or pumped-water storage facilities.

Public-utility system 100 for providing electricity from a public utility includes transmission network 106, substation 107, and distribution lines 108. Transmission network 106, substation 107, and distribution lines 108 include the physical wiring and electrical elements, such as transformers, for delivering electricity from public-utility system 100 to end users. For example, transmission network 106 can include high-voltage transmission elements that transmit wired electrical energy at high voltage such as, for example, 60 kV to 500 kV. A high-voltage transmission network may be used for transmitting electrical energy across relatively long distances. Substation 107 converts high-voltage electrical energy received from transmission network 106 to a lower voltage, and distribution lines 108 distribute electrical energy from substation 107 to end users, such as end users 120A-B. Compared to high-voltage transmission network 106, distribution lines 108 carry electricity at relatively lower voltages, such as for example at or below 50 kV.

Public-utility system 100 for providing electricity from a public utility includes meters 115A and 115B upstream of end users 120A and 120B, respectively. In this disclosure, the upstream direction is the direction away from the end user, while the downstream direction is the direction toward the end user. Meters measure the electrical energy from public-utility system 100 used by an end user, typically in the units of kilo-Watt-hours (kWh). For example, meter 115A measures the electrical energy used by end user 120A from public-utility system 100. Meters often determine how the end user will compensate the public utility for the end user's use of electrical energy. In addition to the amount of electrical energy consumed, the public utility may charge different prices for a unit of electrical energy based on other aspects, such as the time of day during which the electrical energy is consumed or the peak demand for electricity over public-utility system 100.

Figure 2:
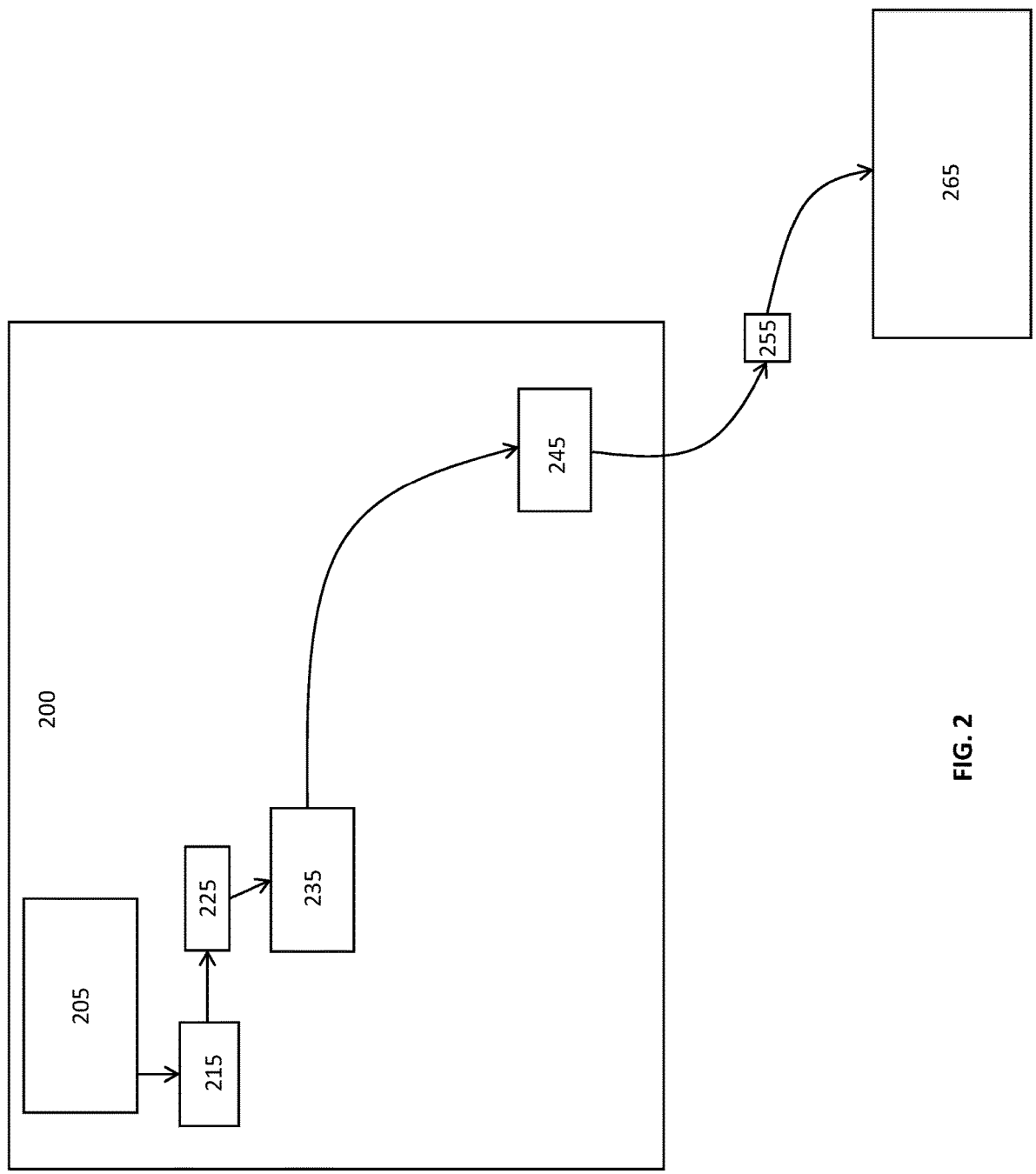
FIG. 2 illustrates an example generation facility for generating electricity and transmitting electricity to a public utility network.

FIG. 2 illustrates an example generation facility 200. In the example of FIG. 2, generation facility 200 includes solar modules 205. While the example generation facility 200 of FIG. 2 is illustrated as having a deployment of solar modules 205, this disclosure contemplates that generation facilities can utilize renewable (e.g., wind, solar, geothermal) energy sources or non-renewable (e.g., fossil fuel, nuclear, or hydropower) sources, or combinations thereof, as discussed more fully herein. Throughout this disclosure, the arrows illustrated in the figures show the general direction of the flow of electricity.

As illustrated in FIG. 2, solar modules 205 of example generation facility 200 connect to combiner boxes 215. In particular, solar modules 205 convert solar energy into electrical energy. Direct current (DC) generated by solar modules 205 feed into combiner boxes 215. For example, solar modules 205 may be wired into multiple, separate strings of modules, and a particular combiner box of combiner boxes 215 combines the DC output of multiple strings for downstream transmission. In other words, each combiner box of combiner boxes 215 may combine the DC output of a set of solar module strings from solar modules 205.

As shown in FIG. 2, the DC output of multiple combiner boxes 215 is fed into one or more electrical panels 225. Electrical panels 225 combine the output from combiner boxes 215 and feed the resulting DC output to one or more inverters 235. Inverters 235 convert the DC input they receive into alternating current (AC) and transmit the resulting AC to downstream components.

As shown in FIG. 2, example generation facility 200 includes a transformer 245 for stepping up the voltage of the AC it receives from inverter 235 for transmission to public-utility substation 265. As illustrated in FIG. 2, a limiter 255 may interface between generation facility 200 and public-utility substation 265. As discussed more fully below, limiter 255 caps the power provided to public-utility substation 265. Limiter 255 may be hardware or a combination of hardware or software that enforces this cap. While FIG. 2 illustrates limiter 255 as separate from substation 265, this disclosure contemplates that limiter 255 may be part of substation 265. In fact, limiter 255 may be the hardware of substation 265 and the limitations associated with that hardware's ability to receive electricity.

In the example of FIG. 2, generation facility 200 connects to, and delivers electricity to, the public utility network grid via substation 265. A generation facility, such as generation facility 200, may sell the electric energy it generates to the public utility whose grid they connect to, to other utilities served by that utility grid, and/or to end-users of electricity to which a utility distributes electricity (e.g., end users 120 shown in FIG. 1).

As shown in FIG. 2, limiter 255 limits the electrical power generation facility 200 can provide to substation 265 and, therefore, to the public-utility electrical network and end users. For example, the electrical equipment in substation 265 may be physically limited in the electrical power it can receive as input and the electrical power it can output. These limitations can be enforced physically by limiter 255 and, in addition, the public utility may require the operator of generation facility 200 to agree not to exceed these limitations, e.g., using contractual or regulatory enforcement mechanisms. These limitations may be referred to as a "utility cap." For example, a utility cap may be 20 MW, i.e., that substation 265 can and will receive no more than 20 MW of electricity from generation facility 200. While this disclosure discusses the limitations specifically imposed by a utility cap, this disclosure contemplates any limitation between a generation facility and connected public-utility equipment (e.g., substation) that effectively serves to limit the power generated by the facility that can be transmitted to the public-utility equipment.

The limitations imposed by limiter 255 substantially impacts the design of generation facility 200, as well as the implementation and operation of those facilities. Similarly, utility caps impact the design of any generation facility that uses renewable resources as a fuel source. A generation facility that uses renewable energy may generate varying amounts of electrical power moment by moment, day by day, and season by season. The power generated ranges from zero (for example, for solar modules at night) to the maximum the facility is capable of generating in optimum conditions (for example, under peak solar irradiance at low temperatures, for solar modules).

As discussed above, a generation facility that utilizes renewable resources, such as generation facility 200 of FIG. 2, generates time-varying electricity, due to natural fluctuations in the underlying energy source, between zero and the facility's maximum generation capability. The typical power generated is usually between those two extremes. Any power generated over the utility cap associated with substation 265 cannot be supplied to substation 265 (or to downstream components), and therefore that excess generated electricity is essentially wasted. However, if a generation facility utilizing renewable resources is implemented such that its maximum generation capability is at or below a corresponding utility cap, the generation facility, on average (and likely at most points in time) transmits electricity below (often substantially below) the utility cap, failing to maximize the energy from renewable sources that a substation could physically accept. For example, if the utility cap imposed by limiter 255 was 20 MW and generation facility 200 was implemented such that the maximum possible output of its solar modules 205 was 20 MW, then at most times generation facility will be producing significantly less than 20 MW of electricity (for example, because the solar irradiance at facility 200 is less than the peak irradiance). However, if generation facility 200 is designed to have a maximum generation capability above the 20 MW utility cap, then any time the facility is operating above the utility cap (e.g., during peak irradiance) the renewable electricity generated above the cap is wasted, as it cannot be transmitted to substation 265 or end users of the public utility network.

While these technical design issues are present for generation facilities that rely on a time-varying energy source, such as a renewable energy source, for solar generation facilities the problem is compounded by the fact that solar modules degrade in efficiency (and therefore, in their ability to convert solar energy to electricity) throughout their lifespan. For example, over a thirty-year lifespan this degradation can easily reach a 45% loss in generation. Therefore, if a generation facility is built to never generate more electricity than permitted by the utility cap, not only will that facility's average generation be below the utility cap, but as the modules degrade over the lifespan of the facility, generation (and therefore, the solar power supplied to the public utility network and downstream end users) will decline even further. On the other hand, if the solar facility is first built to anticipate lifespan degradation and have its average output near the utility cap in later years after degradation has occurred, then much of its electricity will be wasted in early years, as at times it will generate more electricity than a connected substation with an associated utility cap can accept.

In addition, over time solar modules naturally soil with dust, dirt, etc. Dirty solar modules quickly develop hot spots, i.e., areas where soil accumulates unevenly. Hot spots can cause reduced production by the module and its whole string, can accelerate degradation, can cause diode failure, and are one of the primary causes of module failure. In addition, failed modules can be a safety hazard to workers at a solar-generation facility. However, the cost of module cleaning may not be justified if clean modules result in excess power generation over what can be supplied to a connected public-utility network.

Utility caps, soiling, and the degradation of generation facilities over time affect the design and maintenance of a generation facility that utilizes a time-varying energy source, such as a solar facility. These issues result in a design that produces less electricity than the facility is capable of and wastes generated electricity. For example, if soiling of facility equipment reduces the electricity generated by the facility, but preventing or curing soiling would result in generating electricity that the facility could not send to the public utility network, then the generation facility's operator has little incentive to prevent or cure the soiling, and the generation facility will produce less electricity than it is capable of. The generating equipment is therefore usually left soiled, which, in addition to reducing its production, leads to much faster equipment degradation and failure.

In addition, a generation facility such as generation facility 200 may be designed and built with undesirable compromises between generation potential and inverter 235 capacity. For example, the facility may initially be somewhat "overbuilt," so that it wastes electricity early in its lifespan (i.e., at times it generates more power than can be provided to substation 265) but, as solar modules 205 degrade, this wastage declines so that later in its lifespan, it transmits most of the electricity it produces. However, if all the electricity the facility initially produces is fed to enough inverter 235 capacity to convert all the electricity from DC to AC, the resulting AC electricity sent to the limiter 255 can overwhelm the capacity of the limiter. To avoid this, it is necessary to undersize the inverter 235 capacity for the facility. This undersizing, however, further restricts the amount of electricity the facility can produce. This, in turn, further reduces the desirability of proper maintenance that would increase production, because it would be clipped (thrown away) by the undersized inverters.

The results of all these compromises are that it costs the owner more to build a facility larger than initially needed, much of the electricity is wasted for the first half of the facility's lifespan, the facility never produces nearly as much electricity as it is capable of, and the facility degrades and fails more quickly than it would if properly maintained and kept clean.

Once generation facility 200 is deployed, making substantial changes to either generation facility 200 or substation 265 is typically extremely expensive and not a feasible approach to modifying the amount of power generated or transmitted by generation facility 200 or received by substation 265. For example, adding inverter capacity may require substantially rewiring the electrical connections between solar modules 205 and inverters 235, which can be extremely expensive. In addition, "building up" substation 265 so that the substation is capable of receiving more power is typically both extremely expensive and outside of the control of the operator of generation facility 200, as substation 265 is operated by a public utility.

Figure 3:
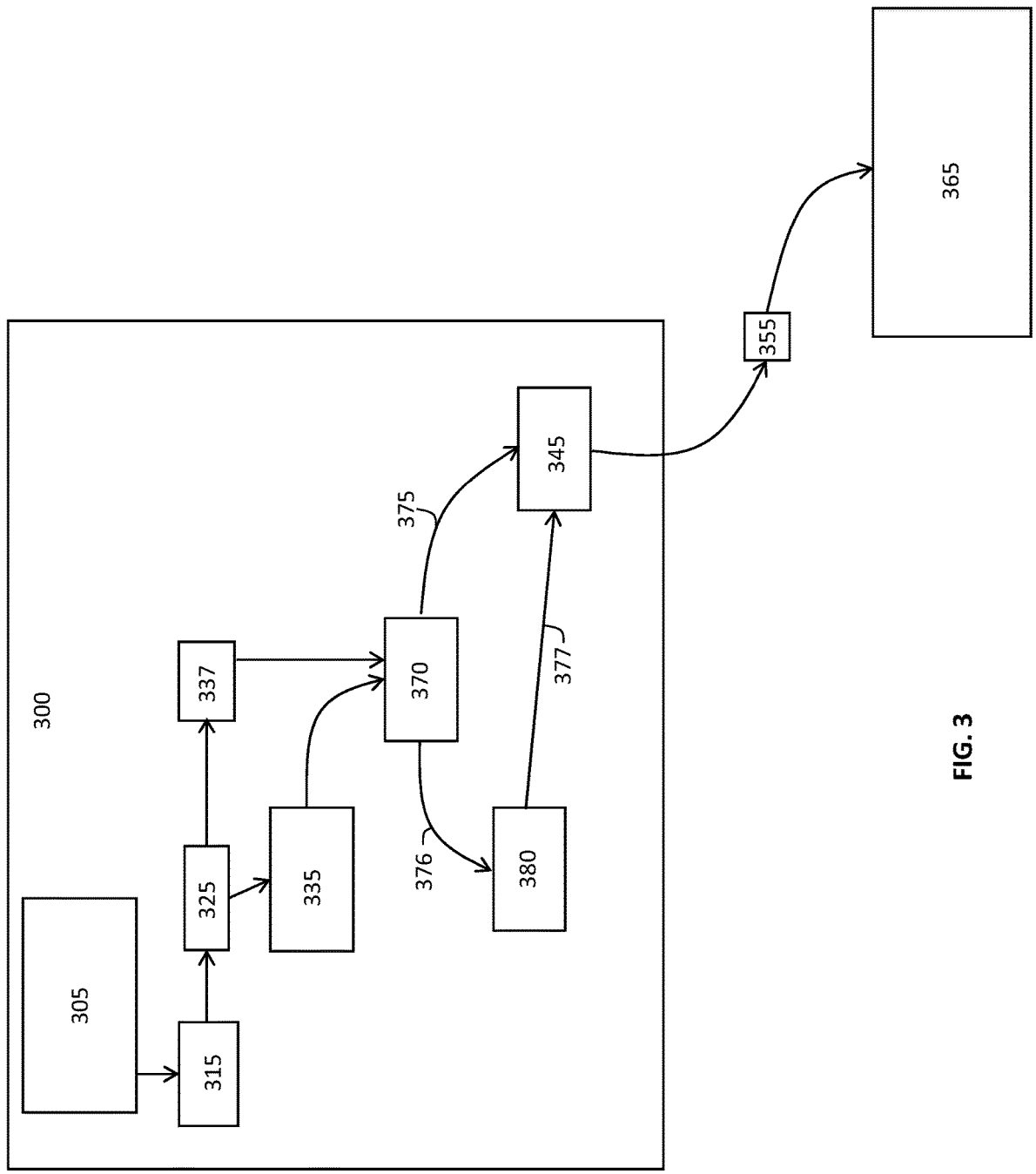
FIG. 3 illustrates an example improved generation facility for generating electricity and transmitting electricity to a public utility network.

FIG. 3 illustrates an improved generation facility 300. As described below, generation facility 300 contains several improvements that maximize production of electricity from the facility that is distributed to end user sites, minimize costs of repairs and replacements, reduce degradation, and increase the usable life of the facility 300. This disclosure describes several examples improvements of generation facility 300, and as described below, these improvements may be implemented to a generation facility in isolation or collectively. As described more fully herein, aspects of generation facility 300 may be implemented as a retrofit to an existing generation facility, such as generation facility 200, or implemented as a part of a newly built generation facility. While the example generation facility of FIG. 3 is represented as a facility that generates electricity from solar energy, this disclosure contemplates that the features discussed herein may be applied as appropriate to any generation facility that relies at least in part on a time-varying energy source, such as a generation facility that relies on a renewable energy source.

Generation facility 300 includes a controller 370 and a battery energy storage system (BESS) 380. As illustrated in FIG. 3, BESS 380 is connected in parallel (via conductive paths 376 and 377) with conductive path 375 leading directly from controller 370 to downstream components, e.g., transformer 345. Therefore, as described more fully below, controller 370 can determine whether, and how much, AC received from inverters 335 and 337 to direct to BESS 380 and how much to direct directly to downstream components, e.g., over wiring 375. While FIG. 3 illustrates that conductive paths 375 and 376 are separate paths at controller 370, this disclosure contemplates other configurations. For example, a single conductive path from controller 370 may initially lead toward BESS 380, and this branch may split before BESS 380 so that electricity can be diverted to BESS 380 or bypass BESS 380 and be delivered directly to downstream components, e.g., transformer 345.

As a result of the design illustrated in FIG. 3, the electricity supplied from generation facility 300 to substation 365 does not come entirely from BESS 380. BESS 380 therefore need not have the capacity required to accommodate the maximum daily energy production of generation facility 300. This greatly improves the feasibility of using BESS system 380, as the cost of a BESS system greatly increases as the storage capacity of the BESS system increases. For example, suppose a BESS system were implemented in generation facility 200 to store all the energy generated by the facility, reducing facility 200's electrical waste. If substation 265 was associated with a utility cap of 20 MW, and a generating facility 300 were designed to produce a maximum power output of 28.6 MW (as a design compromise as described above), then over a 24-hour period this system could produce a maximum of 276 MWh in a typical location (accounting, for example, for the fact that in the typical location, for several hours a solar facility will generate no electricity). A BESS system that was capable of storing not only this amount of energy would be extremely expensive.

In contrast, BESS system 380 of generation facility 300 does not store all the electricity generated by generation facility 300 to substation 365. In fact, most of the electricity output by facility 300 can be transmitted directly to substation 365 over conductive path 375 bypassing BESS system 380. In particular embodiments, only when the electricity generated by facility 300 exceeds the utility cap does controller 370 direct current to BESS 380. As a result, the capacity of BESS 380 can be a fraction (e.g., 7%) of the capacity required to store the daily production of generation facility 300, substantially increasing the feasibility of implementing BESS system 380.

In particular embodiments, controller 370 is a combination of software and hardware for controlling the distribution of electrical power directly to substation 365 (e.g., over conductive path 375) or via BESS 380. In particular embodiments, controller 370 receives AC from central inverters 335, string inverters 337, or both, as described more fully below. For example, as discussed above, when the electricity generated by generation facility 300 exceeds the utility cap associated with substation 365, then controller 370 may direct electricity equal to the utility cap to substation 365 and direct any excess power to BESS 380 (and BESS 380 should be sized and designed to have this amount of storage capacity available). As another example, as described below, controller 370 may direct electricity to BESS 380 even when the electricity being generated by generation facility 300 is less than the utility cap associated with substation 365 in order to send it to substation 365 at a later time when electricity rates are higher. This is known as time-shifting. As described more fully below, controller 370 may decide how much electricity to send to substation 365 and how much to divert to BESS system 380, and that decision may depend on several factors.

In particular embodiments, BESS 380 may include a controller for managing the charging and discharging of the BESS system and distributing electricity downstream to substation 365. In particular embodiments, the controller of BESS 380 (or controller 370, or both) may query the internet, in real time, for weather forecasts, momentary demand, supply, and rates/prices for electricity provided to end users via the utility grid. The controller of BESS 380 may access historical averages and next day forecasts for such energy usage, and determine on a moment-by-moment (e.g., per second, per minute, per hour, or any other suitable unit if time) whether to discharge electricity from the battery to the substation, and at what rate of discharge. The controller of BESS 380 may take BESS 380's state of charge into account and may balance the amount of cycling (how much input & output and at what rates) against other programmed goals (e.g., downstream distribution) to preserve the life of the battery. In particular embodiments, controller 370 and BESS 380 (along with its associated controller) operating in tandem may optimize the delivery of electricity generated by generation facility 300 to end users via substation 365, taking into account the utility cap associated with substation 365, the electricity usage of end users served by generation facility 300, and time-varying rates for electricity. For example, a controller of BESS 380 may communicate the example inputs above to controller 370, which may take this information into account when deciding whether and how much electricity to send to BESS 380.

Controller 370 may determine whether to divert electricity generated by generation facility 300 from Substation 365 to BESS system 380, as well as how much (if any) electricity to divert. This decision may depend on several factors. For example, controller 370 may send electricity to BESS 380 when generation facility 300 is generating more electricity than allowed by a utility cap associated with substation 365. As another example, controller 370 may send electricity to BESS system 380 based on the time of day. For example, controller 370 may utilize current or historical (or both) information about electricity usage of end users served by substation 365 and/or the rates paid per unit of electricity, e.g., expressed in kW. Such information may be accessed over a network (such the internet) by controller 370 or may be accessed from local storage, or both.

In particular embodiments, controller 370 may decide to divert electricity to BESS 380 during a time when electricity rates are below a predetermined threshold. For example, controller 370 may divert electricity to BESS 380 during a time when electricity rates are below peak. As another example, controller 370 may divert electricity to BESS 380 during a time of day when electricity rates are at their daily lowest (which usually occurs during mid-day). That determination may be made based on historical rate data, current rate data, projected future rate data, or a combination thereof.

In particular embodiments, a controller of BESS 380 may decide when to send electricity from BESS 380 to substation 365. In particular embodiments, a controller of BESS 380 and controller 370 may communicate to make such decisions. In particular embodiments, BESS 380 may send electricity to substation 365 when the power generated by solar modules 305 is less than a utility cap associated with substation 365. In particular embodiments, BESS 380 may send electricity to substation 365 based on the rate for electricity or based on the production of generation facility 300, or both. For example, BESS 380 may send electricity to substation 365 during a time when rates for electricity are relatively high and electricity production is relatively low, e.g., at night, provided that the utility cap is not exceeded by the combination of electricity from BESS 380 and provided directly via controller 370.

As explained above, controller 370 and BESS system 380 may work together to divert energy from solar modules 305 to BESS 380 when solar modules are generating electricity above the utility cap or when electric rates are relatively low, and may complement electricity generated by solar modules 305 and sent to substation 365 with electricity from BESS 380 when solar modules 305 are generating energy below the utility cap or when electric rates are relatively high. With respect to the example facility of FIG. 3., electricity generated by a solar facility is often at or near its peak when rates are the lowest, e.g., between 10 am and 2 pm, while the electricity generated by the solar facility may be at or near its minimum (or, at least, less than its peak) when rates are the highest, e.g., between 6 pm and 8 pm. Controller 370 and BESS 380 can modulate the productivity of generation facility 300 by matching electricity supply from generation facility 300 to substation 365 with end-user demand for electricity. However, as described above, the majority of electricity generated by facility 300 is routed directly to substation 365 and not to BESS 380, so that BESS 380 does not need to have a storage capacity on par with the overall generation capability of generation facility 300, significantly reducing the expense and increasing the feasibility of BESS 380.

In particular embodiments, controller 370 and/or BESS 380 may prioritize several factors used to determine whether to transmit energy to BESS 380. For example, a first (highest) priority may be to divert electricity to BESS 380 when the electricity produced by generation facility 300 exceeds a utility cap associated with substation 365. As another example, a second priority may be to reserve enough capacity in BESS 380 so that controller 370 can divert energy to BESS 380 whenever generation facility 300 is generating more electricity than permitted by a utility cap associated with substation 365. The amount of reserved capacity may be a preset threshold, may depend on historical generation information (which may be seasonal), may depend on future projections (e.g., regarding cloudiness), or any suitable combination thereof. In particular embodiments, a third priority may be based on a time of day, for example when electricity rates are relatively low. As this example illustrates, controller 370 may minimize wasted electricity generation (i.e., electricity generated by facility 300 that exceeds the utility cap) and time-shift electricity production of generation facility 300 to match electricity usage, especially when such usage is mismatched with the time-varying generation capabilities of generation facility 300.

As discussed above in connection with FIG. 2, example inverters 235 of generation facility 200 convert DC from solar modules 205 to AC. Depending on the capacity of inverters 235, inverters 235 in generation facility 200 may also function to reduce the power output from solar modules 205 to substation 265. In existing facilities, while this reduction in power reduces the production of generation facility 200, the reduction may nevertheless be irrelevant to the electricity supplied to substation 265 because a utility cap associated with substation 265 limits the electricity that generation facility 200 sends to substation 265. In other words, when the capacity of inverters 235 is less than the electricity generated by solar modules 205, then inverters 235 clip some of the power from solar modules 205.

In contrast, example generation facility 300 of FIG. 3 is able to use all the power generated by solar modules 305, even when such power generation exceeds a utility cap associated with substation 365. If facility 300 were initially deployed with inverters 335 that did not have sufficient capacity to convert DC from solar modules 305 to AC, then inverters 335 will limit the production of generation facility 300. Adding inverter capacity by replacing inverters 335 with higher capacity inverters generally requires rewiring all solar modules 305 in generation facility 300, which is very expensive and not a feasible solution to overcoming the inefficiencies caused by inadequate inverters 335.

In generation facility 300, each central inverter 335 is wired to a group of strings of solar modules 305, often underground through conduit. As illustrated in FIG. 3, in addition to central inverters 335, generation facility 300 includes one or more string inverters 337. The wiring of central inverters 335 need not be changed by the presence of string inverters 337. Instead, string inverters 337 boost the total inverter capacity of generation facility 300. For example, in example generation facility 300, a lead from each group of solar module strings may be wired to one combiner of combiners 315. DC from multiple strings are combined by combiners 315, and one or more combiners 315 feed each inverter via wiring from electrical panel 325, which interposes between combiners 315 and central inverters 335. For example, with reference to FIG. 2, each central inverter 235 may be fed by, e.g., six combiner boxes 215 of the example generation facility 200.

At electrical panel 325, the wiring leading one or more combiner boxes is diverted from central inverters 335 to string inverters 337. String inverters 337 may each provide a fraction, e.g., 10% or 15%, of the capacity of each central inverter 335. For example, wiring from one of six combiner boxes feeding an existing central inverter may be diverted at electrical panel 325 to string inverter 337. Notably, wiring among solar modules 305, from modules to combiner boxes 315, and from combiner boxes to electrical panel 325 need not be altered, while string inverters 337 provide the additional inverter capacity necessary to prevent clipping and increase the productivity of generation facility 300.

As illustrated in FIG. 3, outputs from central inverters 335 and string inverters 337 at each location are wired to controller 370, which is in turn wired both to BESS 380 and transformer 345 stepping up the AC voltage for transmission to substation 365. While this disclosure provide examples of the relative capacity of string inverters 337 and central inverters 335 and the number of combiner boxes fed by central inverters 335 and string inverters 337, these examples are for illustrative purposes only. This disclosure contemplates any suitable relative capacities, number of string and central inverters, and leads fed to string inverters and central inverters.

As discussed above, solar modules 205 of generation facility 200 naturally soil over time, which both significantly decreases the productivity of solar modules 205 and creates hot spots that cause solar modules to fail prematurely and increase degradation of the solar modules. While keeping solar modules sufficiently free of soil maximizes their production helps prevent hotspots and maximizes production, as discussed above these steps may not be feasible when improved production would be wasted due to the presence of a utility cap associated with substation 265.

In contrast, with respect to the example generation facility 300 of FIG. 3, electricity production (both in the present, due to clean modules, and in the future, due to improved module reliability and extended life) can be utilized by generation facility 300, even when that production would exceed an associated utility cap. Thus, the design of generation facility 300 greatly improves the feasibility of using a module-cleaning system, which improves module production, reliability, and lifetime, because, for example, more than 50% of module failures may be due to hot spots created by soiling.

For example, in an example cleaning system each module is equipped with a highly durable sprayer-nozzle designed expressly for this application. These nozzles may be fed by polyurethane pipes, especially resistant to UV degradation and other sources of decay. The pipes may be connected to pumps that draw water from tanks, running through a water-softening and filtration system, controlled by a programmable controller that regulates water flow and pressure and monitors the system's performance.

As explained above, aspects of the systems and methods described herein may use one or more computer systems, such as a processor and storage media. The architecture of a computer system is well-know and is described, for example, in paragraphs 35-44 and FIG. 3 of U.S. Patent Application Publication No. 2015/0062178, portions of which are reproduced below and are incorporated by reference herein.

Figure 4:
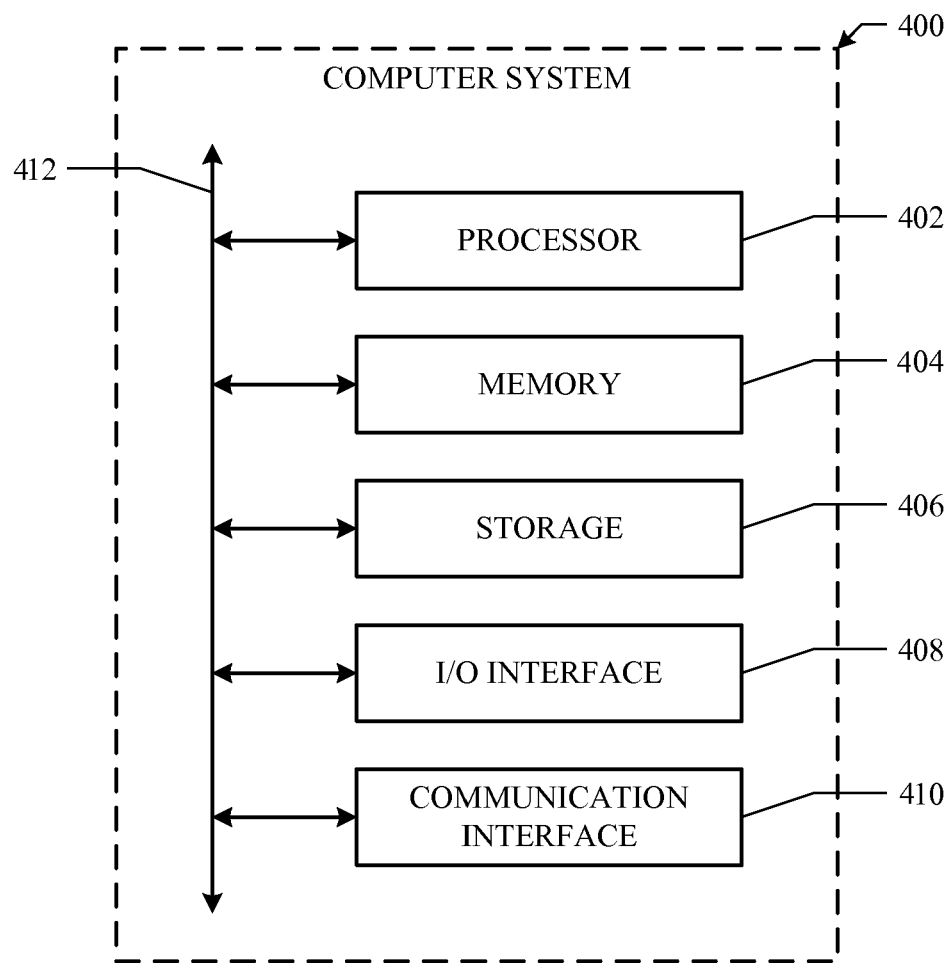
FIG. 4 illustrates an example computer system.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend.

What is claimed is:

1. A generation facility upstream of a public utility network for producing electricity comprising:
    one or more electricity-generating elements for producing electricity from a renewable energy source;
    a controller upstream of the public utility network and conductively coupled to:
        a first conductive path leading from the one or more electricity-generating elements;
        a second conductive path leading to the public utility network; and
        a third conductive path leading to an energy storage system, upstream of the public utility network, for storing electrical energy, wherein the energy storage system is conductively coupled to a fourth conductive path leading to the public utility network, the controller comprising one or more processors coupled to a non-transitory computer readable storage media embodying software that is operable when executed by the processors to:
    determine whether an amount of electricity produced by the one or more electricity generating elements exceeds an electricity cap associated with the public utility network;
    when the amount of electricity produced by the one or more electricity-generating elements exceeds the electricity cap, then direct an amount of electricity less than or equal to the electricity cap to the public utility network over the second conductive path, and direct the remaining electricity produced by the one or more electricity-generating element to the energy storage system over the third conductive path; and
    when the amount of electricity produced by the one or more electricity-generating elements does not exceed the electricity cap, then determining, based on one or more priorities for distributing electricity and on a current or future rate of electricity, how much of the electricity produced by the one or more electricity-generating elements to direct to the public utility network over the first conductive path.

2. The generation facility of claim 1, wherein at least part of the second conductive path and the third conductive path comprise at least part of two separate conductive paths connected in parallel with the controller and a downstream electrical component.

3. The generation facility of claim 2, wherein the downstream electrical component comprises a transformer for stepping up a voltage of electricity provided by the generation facility to the public utility network.

4. The generation facility of claim 1, wherein the energy storage system has a capacity that is less than a maximum amount of electricity that the generation facility is capable of producing during a 24-hour period.

5. The generation facility of claim 4, wherein the capacity of the energy storage system is no more than 25% of the maximum amount of electricity that the generation facility is capable of producing during the 24-hour period.

6. The generation facility of claim 1, wherein when the amount of electricity produced by the one or more electricity-generating elements does not exceed the electricity cap, the controller is configured to determine to send all the electricity produced by the one or more electricity-generating elements to the public utility network.

7. The generation facility of claim 1, wherein the controller software is operable when executed by the processors to determine, based at least on part on a time of day, whether to direct at least some of the electricity produced by the one or more electricity-generating elements to the energy storage system.

8. The generation facility of claim 1, wherein the controller software is operable when executed by the processors to determine whether to direct at least some of the electricity produced by the one or more electricity-generating elements to the energy storage system based on:
    a first priority comprising a determination of whether an amount of electricity produced by the one or more electricity generating elements exceeds an electricity cap associated with the public utility network;
a second priority based on a state of charge of the energy storage system; and
a third priority based on a time of day.

9. The generation facility of claim 8, wherein the controller software is operable when executed by the processors to determine whether to direct at least some of the electricity produced by the one or more electricity-generating elements to the energy storage system based on:
a fourth priority based on one or more prices for one or more contemporaneous sales of electricity;
a fifth priority based on historical or forecasted prices for sale of electricity over a predetermined time period;
a sixth priority based on a weather forecast for the area in which the facility is sited; and
an seventh priority based on a demand for electricity from one or more users.

10. The generation facility of claim 9, wherein the software is operable when executed by the processors to determine, based on one or more of the priorities, whether to discharge stored electricity from the energy storage system to the public utility network.

11. The generation facility of claim 9, wherein the predetermined time period comprises a 24-hour period.

12. The generation facility of claim 1, wherein the current or future rate of electricity is determined based at least in part on a historical rate of electricity.

13. The generation facility of claim 1, wherein the electricity-generating elements comprise one or more solar modules.

14. The generation facility of claim 13, further comprising an automated cleaning system for cleaning at least some of the one or more solar modules.

15. The generation facility of claim 1, further comprising:
one or more first inverters conductively coupled between the one or more electricity generating elements and the controller; and
one or more second inverters conductively coupled between the one or more electricity generating elements and the controller.

16. The generation facility of claim 15, wherein the one or more second inverters each have a capacity that is less than a capacity of each of the one or more first inverters.

17. A controller comprising one or more processors and a non-transitory computer readable storage media embodying software coupled to the one or more processors, the one or more processors operable to execute the software to:
determine whether to send electricity generated by one or more electricity-generating elements for producing electricity from a renewable energy source to an energy storage system, wherein the controller is conductively coupled to:
a first conductive path leading from the one or more electricity generating elements;
a second conductive path leading to a public utility network; and
a third conductive path leading to the energy storage system, wherein the energy storage system is conductively coupled to a fourth conductive path leading to the public utility network, and wherein the processors are operable to execute the software to:
determine whether an amount of electricity produced by the one or more electricity generating elements exceeds an electricity cap associated with the public utility network;
when the amount of electricity produced by the one or more electricity-generating elements exceeds the electricity cap, then direct an amount of electricity less than or equal to the electricity cap to the public utility network over the second conductive path, and
direct the remaining electricity produced by the one or more electricity-generating element to the energy storage system over the third conductive path; and
when the amount of electricity produced by the one or more electricity-generating elements does not exceed the electricity cap, then determining, based on one or more priorities for distributing electricity and on a current or future rate of electricity, how much of the electricity produced by the one or more electricity-generating elements to direct to the public utility network over the first conductive path.

18. The controller of claim 17, wherein when the amount of electricity produced by the one or more electricity-generating elements does not exceed the electricity cap, the controller is configured to determine to send all the electricity produced by the one or more electricity-generating elements to the public utility network.

19. A method comprising:
determining, by a controller comprising one or more processors and a non-transitory computer readable storage media embodying software coupled to the one or more processors, whether an amount of electricity produced by one or more electricity-generating elements for producing electricity from a renewable energy source exceeds an electricity cap associated with a public utility network, wherein the controller is conductively coupled to:
a first conductive path leading from the one or more electricity generating elements;
a second conductive path leading to the public utility network; and
a third conductive path leading to an energy storage system, wherein the energy storage system is conductively coupled to a fourth conductive path leading to the public utility network;
when the amount of electricity produced by the one or more electricity-generating elements exceeds the electricity cap, then directing an amount of electricity less than or equal to the electricity cap to the public utility network over the second conductive path, and directing the remaining electricity produced by the one or more electricity-generating element to the energy storage system over the third conductive path; and
when the amount of electricity produced by the one or more electricity-generating elements does not exceed the electricity cap, then determining, based on one or more priorities for distributing electricity and on a current or future rate of electricity, how much of the electricity produced by the one or more electricity-generating elements to direct to the public utility network over the first conductive path.

20. The method of claim 19, further comprising determining, by the controller, to send all the electricity produced by the one or more electricity-generating elements to the public utility network when the amount of electricity produced by the one or more electricity-generating elements does not exceed the electricity cap.

* * * * *